United States Patent

Carman

[15] 3,673,814

[45] July 4, 1972

[54] GEAR TYPE COUPLING

[72] Inventor: Kenneth K. Carman, Ellicott City, Md.

[73] Assignee: Koppers Company, Inc.

[22] Filed: Nov. 16, 1970

[21] Appl. No.: 89,764

[52] U.S. Cl. .................................................64/8, 64/9 R
[51] Int. Cl. ..............................................F16d 3/16
[58] Field of Search ........................64/8, 9, 16, 21

[56] References Cited

UNITED STATES PATENTS

| | | | |
|---|---|---|---|
| 2,769,323 | 11/1956 | O'Malley | 64/9 |
| 3,132,494 | 5/1964 | Hoffer | 64/9 |
| 2,659,217 | 11/1953 | Talbot | 64/9 |

*Primary Examiner*—Kenneth W. Sprague
*Attorney*—Boyce C. Dent, Oscar B. Brumback and Olin E. Williams

[57] ABSTRACT

A coupling for two shafts subject to misalignment includes an adapter secured to one of the shafts. A sleeve member is nonrotatably secured to the adapter by a retaining ring and has inwardly extending gear teeth. An outer hub member is positioned in the bore of the sleeve member and has both outwardly and inwardly extending gear teeth. The outwardly extending gear teeth mate with the sleeve member inwardly extending gear teeth and nonrotatably connect the outer hub and sleeve member. The outer hub outwardly extending gear teeth have an arcuate configuration so that the hub member is deflectable angularly. The outer hub member has a shoulder portion that limits angular deflection. An inner hub member is secured to the other of the shafts and is positioned within the bore of the outer hub member. The inner hub member has outwardly extending gear teeth that mate with the inwardly extending gear teeth of the outer hub member to nonrotatably connect the inner and outer hub members. The inner hub member gear teeth have an arcuate configuration so that the inner hub member is deflectable angularly to a limited extent. The outer hub member has a thrust plate enclosing an end portion and a thrust bar within the shaft urges the inner hub member into axial alignment with the outer hub member. The shafts are disconnected by removing the retainer ring and sliding the sleeve member over a shaft away from the adapter. The sleeves of a pair of couplings are also connected to each other to connect a pair of misaligned shafts.

10 Claims, 4 Drawing Figures

PATENTED JUL 4 1972

INVENTOR
Kenneth K. Carman

BY [signature] Bayer C. Dent
HIS ATTY.

INVENTOR
Kenneth K. Carman

BY [signature]
HIS ATTY.

GEAR TYPE COUPLING

BACKGROUND OF THE INVENTION

1. Field of the Invention

This invention relates to a gear type coupling and more particularly to a gear type coupling that transmits torque between misaligned shafts.

2. Description of the Prior Art

Gear type couplings to connect misaligned shafts and to transmit high torque are well-known and are disclosed in U.S. Pat. Nos. 3,132,494; 3,070,979; 3,010,294 and 2,769,323. This type of coupling is primarily used in rolling mill applications where the rolls are driven by a roll drive shaft through a spindle shaft connected to the respective roll shaft and drive shaft by flexible gear type couplings. The misalignment between the drive and driven shafts is taken up in the couplings and the couplings usually include an outer member connected to the shaft and an inner member connected to the spindle shaft. The outer member has inwardly extending gear teeth that mesh or mate with the outwardly extending gear teeth of the inner member. The gear teeth are so shaped that the inner member is deflectable angularly relative to the outer member and yet is capable of transmitting torque therethrough. In the deflected or misaligned position the gear teeth are subjected to high point loading and frequently fail where the deflection exceeds a predetermined degree.

To connect and disconnect the driving and driven shafts during a roll change, substantial misalignment of the couplings is required at no load or torque and the couplings are constructed for this misalignment. The couplings thus constructed may exceed the safe deflection, when subjected to high torque, and fail. To minimize this problem it has been proposed to position an inner hub within an outer hub and connect the hubs to each other by a gear connection therebetween, as is disclosed in U.S. Pat. No. 2,769,323. This arrangement permits the coupling to deflect between the outer member and the outer hub and also to deflect between the inner and outer hubs. A problem with this type of coupling is the reduced gear tooth area between the inner and outer hub members when the hubs are deflected relative to each other. The reduced gear tooth area limits the torque that can be transmitted through the coupling in this deflected position. Another problem encountered with the gear coupling is the complex design that requires substantial dismantling of the coupling to free the shafts for a roll change. There is a need, therefore, for a double gear type coupling where the normal running misalignment is taken up in the large gear teeth of the outer hub and the coupling may quickly and easily be dismantled even in a misaligned condition.

SUMMARY OF THE INVENTION

In accordance with the present invention an outer hub member is nonrotatably secured by means of a gear type connection to the inner surface of a sleeve and is deflectable angularly thereto to a limited extent. An inner hub member is positioned within and nonrotatably connected to the outer hub member by a gear type connection and is also angularly deflectable relative thereto. Resilient means urges the inner hub member into aligned relation with the outer hub member so that the outer hub member deflects relative to the sleeve before the inner hub member deflects relative to the outer hub member. In one embodiment the sleeve member is secured to an adaptor by a retainer ring and the shafts connected by the coupling are disconnected by removing the retainer ring and sliding the sleeve away from the adapter.

Accordingly, the principal object of this invention is to provide a double gear coupling where the running misalignment is taken up in the external teeth of the outer hub.

Another object of this invention is to provide a double gear coupling where the inner hub member remains axially aligned with the outer hub member until the outer hub member is deflected angularly a preselected amount relative to the sleeve member.

A further object of this invention is to provide a double gear coupling between a roll drive shaft and a roll that is quickly and easily disconnected.

These and other objects and advantages of this invention will be more completely disclosed and described in the following specification, the accompanying drawings and the appended claims.

DESCRIPTION OF THE PREFERRED EMBODIMENTS

Figure 1:
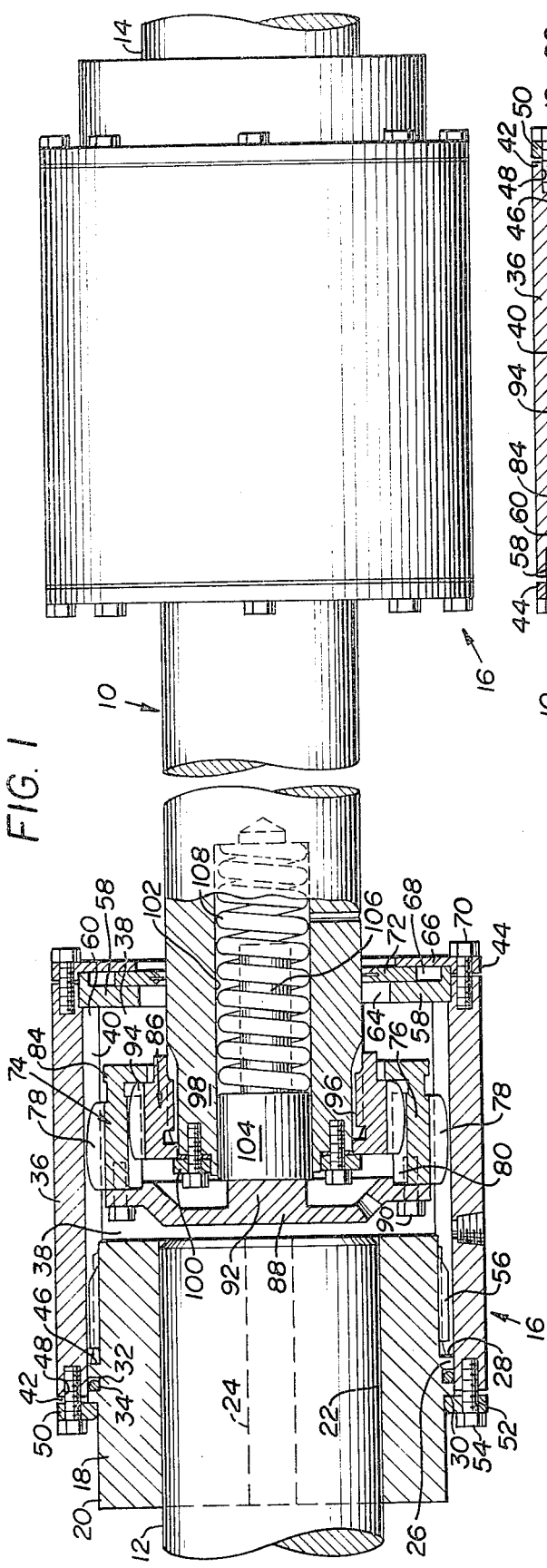
FIG. 1 is a view in side elevation and partially in section illustrating a pair of gear type couplings connecting a drive shaft to a driven shaft through a spindle shaft.
Figure 2:
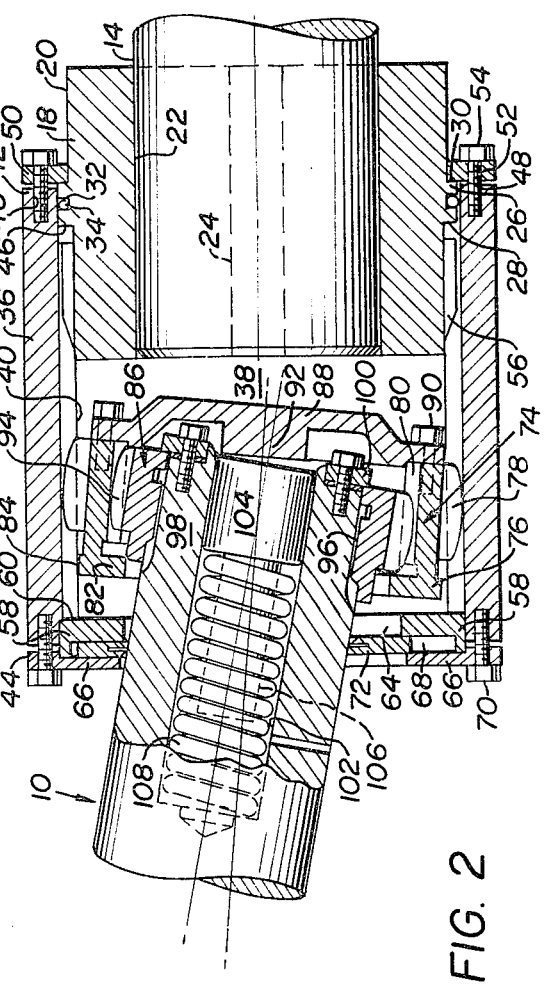
FIG. 2 is a view in section and in elevation of the coupling illustrated in FIG. 1 with the spindle shaft angularly deflected from the driven shaft.

Referring to the drawings and particularly FIGS. 1 and 2, there is illustrated a spindle shaft generally designated by the numeral 10 connecting a pinion or drive shaft 12 with a roll shaft 14 that is associated with a roll. Pairs of couplings 16 connect the spindle shaft 10 to the respective shafts 12 and 14 and are of similar construction so that the same numerals will designate similar parts.

The coupling 16 has an adapter member 18 with a cylindrical outer surface 20 and an axial bore 22. The roll shaft 14 is nonrotatably secured within the adapter axial bore 22 for rotation therewith. A longitudinal keyway 24 is formed in the inner bore 22 of adapter 18 and the roll shaft 14 has a mating key positioned therein to nonrotatably secure the shaft within the adapter 18.

The cylindrical outer surface 20 of adapter 18 has an annular outwardly extending shoulder portion 26 with a first annular surface 28 and a second annular surface 30. There is an annular O-ring recess 32 between the shoulder surfaces 28 and 30 in which an O-ring 34 is positioned. A sleeve member 36 has an axial bore 38 therethrough with inwardly extending gear teeth 40 and annular end portions 42 and 44. The inwardly extending gear teeth 40 terminate at a shoulder portion 46 adjacent the sleeve end portion 42. The adapter 18 is positioned within the sleeve bore 38 with the outwardly extending annular shoulder portion 28 abutting the shoulder 46 formed by the sleeve gear teeth 40 to thus limit axial movement of the sleeve 36 relative to the adapter 18 in one axial direction. The sleeve annular end portion 42 has a plurality of threaded bores 48 therein and an annular retainer ring 50 is positioned in overlying relation with the sleeve annular end portion 42 with bolt apertures 52 aligned with the apertures 48 in the sleeve member 36.

The retainer ring 50 has an inwardly extending annular portion abutting the annular shoulder 30 of the adapter 18 and is secured in that position by the bolts 54. The retainer ring 50 thus limits the axial movement of the adapter 18 relative to the sleeve member 36 in the other direction so that the adapter 18 is axially fixed relative to the sleeve 36. The adapter 18 has outwardly extending gear teeth 56 which mesh or mate with the inwardly extending gear teeth 40 of sleeve 36 to thus provide a nonrotatable connection therebetween. To remove the sleeve 36 from the adapter 18 the retainer ring 50 is removed from the end 42 of sleeve 36 and the sleeve 36 is moved axially away from the adapter 18 to thus disconnect the sleeve 36 from adapter 18.

An end ring 58 is positioned within the sleeve bore 38 and abuts the shoulder portion 60 formed by the inwardly extending gear teeth 40. The end plate 58 has a peripheral shoulder portion 62 and a central aperture 64. An end ring plate 66 is positioned in overlying relation with the end ring 58 and provides a recessed portion 68 therebetween and is secured to the sleeve member 36 by bolts 70. A resilient seal ring 72 surrounds the outer surface of the spindle shaft 10 and extends into the recessed portion 68 between the plates 58 and 66 to provide a lubricant seal. With this arrangement the shaft 10 may be angularly deflected relative to the sleeve 36 while the seal ring 72 moves within the recess 68 to maintain the seal therebetween.

An outer hub member generally designated by the numeral 74 has a body portion 76 with radially outwardly extending gear teeth 78 and inwardly extending gear teeth 80. The outer hub member 74 is positioned within the bore 38 of sleeve 36 and the outwardly extending gear teeth 78 mesh or mate with the gear teeth 40 on sleeve 36 to provide a nonrotatable connection therebetween. The outwardly extending gear teeth 78 have an arcuate configuration to permit angular deflection of the outer hub 74 relative to the sleeve member 36 while retaining a nonrotatable connection therebetween. The hub body portion 76 has an annular inwardly extending end portion 82 with an outwardly extending shoulder portion 84. The outer annular shoulder portion 84 is arranged to abut the inwardly extending gear teeth 40 of sleeve 36 to thus limit angular deflection of hub member 74 relative to sleeve member 36. The inwardly extending shoulder portion 82 limits axial movement of an inner hub member generally designated by the numeral 86. A thrust plate 88 is secured to the hub member body portion 76 by means of bolts 90 opposite to the inwardly extending annular shoulder 86 and has an axial thrust abutment portion 92.

The inner hub member 86 has radially outwardly extending gear teeth 94 and is positioned within the bore of the outer hub member 74 with the outwardly extending gear teeth 94 meshing with the outer hub member inwardly extending gear teeth 80 to non-rotatably connect the inner hub member 86 to the outer hub member 74. The outwardly extending gear teeth 94 have an arcuate configuration to permit the angular deflection of the inner hub member 86 relative to the outer hub member 74. The inner hub member has a central bore 96 therethrough and the end portion 98 of spindle shaft 10 extends into the bore 96 and is nonrotatably secured therein by means of suitable keys. A hub retainer ring 100 secures the hub 86 on the end portion of spindle shaft 10 and limits axial movement thereon.

The spindle shaft 10 has an axial bore 102 therein in which there is positioned a cylindrical thrust bar 104 that has an end portion of reduced diameter 106. A coil spring 108 extends around the end portion 106 and urges the thrust bar against the thrust abutment portion 92 of thrust plate 88. The thrust bar 104 urges the end portion 98 of spindle shaft 10 and the inner hub member 86 away from the thrust plate 92 toward the annular inwardly extending shoulder or abutment 82 on outer hub member 74 to thus maintain the inner hub member 86 in axial alignment with the outer hub member 74 until the outer hub member 74 is deflected to the extent that stop shoulder portion 84 abuts the inner gears 40 of sleeve 36. Further deflection of the shaft 10 relative to the sleeve 36 is then taken up by the inner hub member 86 deflecting relative to the outer hub member 74 against the force of the spring 106. With this arrangement the inner hub member remains coaxially aligned with the outer hub member 74 until the outer hub member has deflected to the maximum permitted by the stop member 84. Thus, running misalignment which does not usually exceed the deflection permitted by the outer hub member 74 relative to the sleeve 36 is taken up by the outer hub member 74 and the inner hub member remains axially aligned with the outer hub member 74.

Referring to FIG. 2, the coupling 16 is illustrated in its maximum deflected or misaligned position where the outer hub 74 is deflected to the extent that the stop member 84 abuts the gear teeth 40 of sleeve 36 and the inner hub member 86 is deflected relative to the outer hub member 74 to the extent that the vertical walls of the inner hub member abut the inner surface of the thrust plate 88 and the inner extending shoulder portion 82.

The coupling 16 may quickly disconnect the spindle shaft 10 from the adapter 18 by removing the bolts 54 securing the retainer plate 52 to the sleeve member 36. The sleeve member 36 is then moved laterally from the adapter 18 over the spindle shaft 10 until the sleeve 36 is free of the adapter 18. The coupling 16 may be disconnected with the spindle shaft 10 misaligned as long as the sleeve 36 is slidable on the spindle shaft 10. As is illustrated in FIG. 1, the spindle shaft 10 can be removed from both the drive shaft 12 and the roll shaft 14 without moving either of the shafts 12 or 14. To remove the spindle shaft 10 both bolts 70 are removed and the sleeves 36 moved laterally toward each other until they are free from the adapters 20 remaining on the respective shafts.

Figure 3:
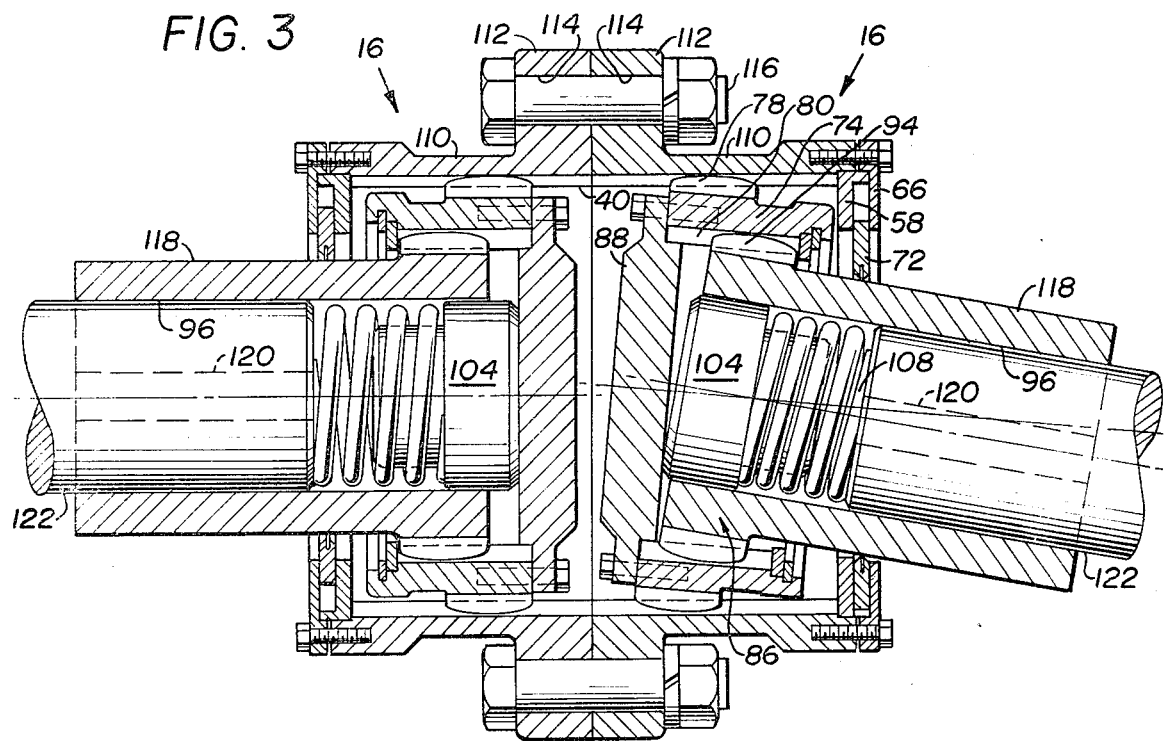
FIG. 3 is a view in elevation and in section of a pair of shafts drivingly connected to each other by a pair of couplings with their external sleeve members secured to each other.

Referring to FIG. 3 a pair of couplings 16 are illustrated with modified sleeve members 110 that have radially outwardly extending end flanges 112 with longitudinal bolt holes 114 therethrough. The sleeves 110 are positioned in abutting relation with each other and bolts 116 secure the sleeve flange members to each other to form a double coupling member.

The remaining portions of the couplings 16 are similar in construction to the previously described coupling and will be designated by similar numerals. The inner hub member 86 has an elongated cylindrical end portion 118 with a longitudinal keyway 120 therein. The shaft 122 is nonrotatably positioned in the central bore 96 of the inner hub member 86 with a key extending into keyway 120. The shafts 122 are restrained from axial movement relative to the hub member 86 to permit the thrust bar 104 to abut the thrust plate 88 and urge the inner hub member against the inwardly extending shoulder of outer hub member 74 so that the inner hub member 86 remains axially aligned with the outer hub member 74 as previously discussed.

With the above arrangement of the pair of couplings 16 connected to each other by bolts 116 extending through the sleeve flange portions 112, a pair of shafts 122 are connected to each other and the coupling permits the shafts 122 to angularly deflect or misalign while torque is being transmitted therethrough.

Figure 4:
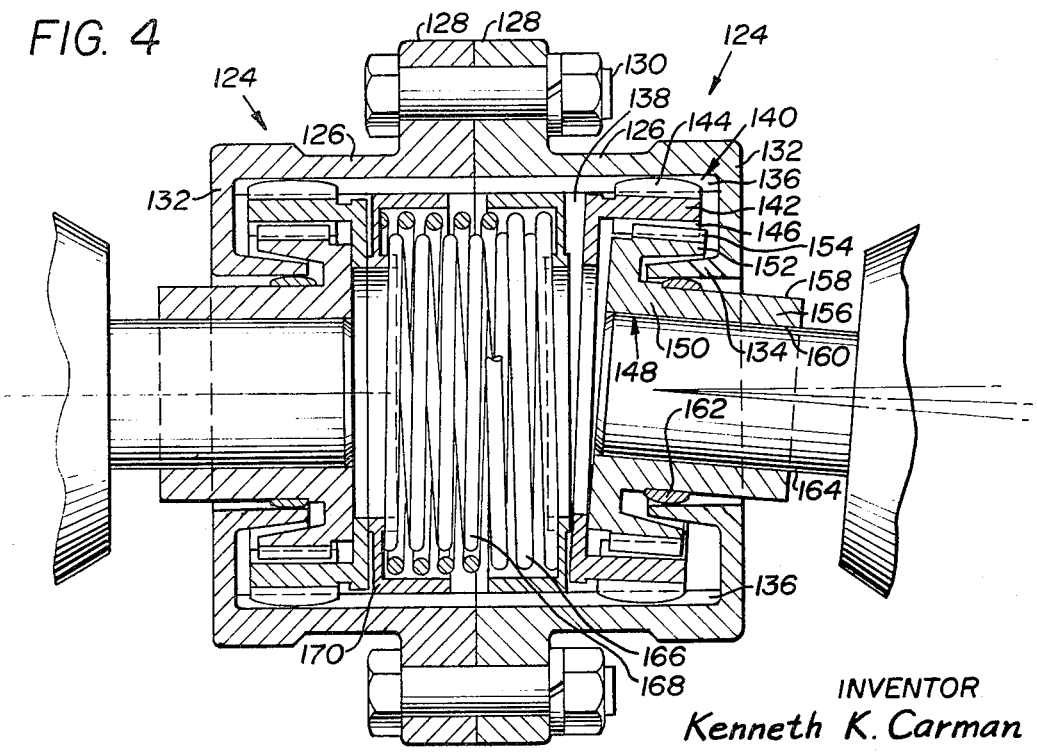
FIG. 4 is a view similar to FIG. 3 illustrating another embodiment of the gear type couplings for a pair of shafts.

Referring to FIG. 4 there is another embodiment of the gear type coupling illustrated in FIG. 3. The pair of couplings 124 have a sleeve member 126 with a radial flange portion 128. The flange portions are positioned in abutting relation with each other and bolts 130 secure the sleeves 126 to each other. The sleeves 126 have a depending annular end portion 132 with an inwardly extending flange 134 and inwardly extending gear teeth 136 within the sleeve axial bore 138.

An outer hub member generally designated by the numeral 140 has a body portion 142 with radially outwardly extending gear teeth 144 and inwardly extending gear teeth 146. The gear teeth 144 have an arcuate configuration to permit angular deflection between the sleeve 126 and the outer hub member 140. The outer hub member 140 is positioned within the bore 138 with the gear teeth 140 meshing with the gear teeth 136 of the sleeve 126.

An inner hub member generally designated by the numeral 148 has a body portion 150 with an outer annular portion 152 having outwardly extending gear teeth 154. A central cylindrical connecting portion 156 has an outer surface 158 and a central bore 160. The hub 148 is positioned with the outwardly extending gear teeth 154 meshing with the inwardly extending gear teeth 146 of outer hub 140. The inwardly extending flange 134 of sleeve 126 is positioned between the annular portion 152 and the connecting portion outer surface 158 of hub 148. An annular bearing member 162 is secured to the outer surface 158 of hub connecting portion 156 and abuts the inwardly extending flange 134 of sleeve 126. A shaft 164 is nonrotatably positioned within the bore 160 of inner hub 158.

An outer coil spring 166 and an inner coil spring 168 are positioned within the bore 138 of both sleeves 126 and abut annular thrust rings 170. With this arrangement, the coil springs urge the thrust rings 170 against the outer hub members 140 which, in turn, urge the outer hub members 140 against the inner hub 148 to maintain the inner hub member 148 coaxially aligned with the outer hub member 140. Both of the coupling connections illustrated in FIGS. 3 and 4 may be quickly disconnected by removing the bolts 116 in FIG. 3 and 130 in FIG. 4 respectively.

According to the provisions of the patent statutes, the principle, preferred construction, and mode of operation of the invention have been explained, and what is considered to represent its best embodiments have been illustrated and described. However, it should be understood that, within the scope of the appended claims, the invention may be practiced otherwise than as specifically illustrated and described.

I claim:

1. A gear type coupling comprising,
   a sleeve member having inwardly extending gear teeth,
   an outer hub member positioned in said sleeve member and having an annular body portion with outwardly extending gear teeth and inwardly extending gear teeth,
   said outer hub member outwardly extending gear teeth positioned between said sleeve member inwardly extending gear teeth to provide a nonrotatable connection therebetween,
   said outer hub member operable to deflect angularly relative to said sleeve,
   an inner hub member having outwardly extending gear teeth positioned within said outer hub member with said outwardly extending gear teeth positioned between said outer hub member inwardly extending gear teeth to provide a nonrotatable connection therebetween,
   said inner hub member operable to deflect angularly relative to said sleeve and said outer hub member, and
   resilient means urging said outer hub member axially against said inner hub member to maintain said outer hub member axially aligned with said inner hub member while said outer hub member deflects angularly relative to said sleeve member.

2. A gear type coupling as set forth in claim 1 in which,
   said outer hub member outwardly extending gear teeth and said inner hub member outwardly extending gear teeth having an arcuate configuration to permit angular deflection of said hub members relative to each other and relative to said sleeve member and maintain nonrotatable connections therebetween.

3. A gear type coupling as set forth in claim 1 which includes,
   a radially outwardly extending annular shoulder portion on said outer hub member body portion operable to abut said sleeve member inwardly extending gear teeth to limit angular deflection of said outer hub member relative to said sleeve member.

4. A gear type coupling as set forth in claim 1 in which,
   said resilient means urges an inwardly extending annular shoulder on said outer hub member against said inner hub member.

5. A gear type coupling as set forth in claim 1 which includes,
   a spindle shaft nonrotatably secured to said inner hub member and having an axial bore therein, and
   a thrust rod positioned in said bore and abutting a thrust plate secured to said outer hub member,
   said resilient means urging said thrust rod against said thrust plate to thereby urge an inwardly extending annular shoulder portion on said outer hub member against said inner hub member to maintain said inner hub member axially aligned with said outer hub member.

6. A gear type coupling as set forth in claim 1 which includes,
   a spindle shaft secured to said inner hub member,
   an adapter member positioned in the bore of said sleeve in nonrotatable relation thereto, and
   retaining means to secure said adapter to said sleeve and prevent axial movement of said sleeve relative to said adapter member,
   said sleeve member operable upon removal of said retaining means to move axially on said shaft away from said adapter member to thereby disconnect said shaft from said adapter member.

7. A gear type coupling as set forth in claim 6 in which,
   said adapter member includes an annular shoulder portion having one annular surface abut said sleeve member inwardly extending gear teeth to thereby limit axial movement of said sleeve member relative to said adapter member in one direction,
   said retaining means including an annular retainer ring removably secured to the annular end portion of said sleeve member and abutting the other annular surface of said annular shoulder portion to thereby limit axial movement of said sleeve member relative to said adapter member in the opposite direction.

8. A gear type coupling as set forth in claim 1 in which,
   said sleeve member has a radially outwardly extending flange member operable to be secured to a similar flange member of a second gear type coupling to nonrotatably connect a pair of shafts that are angularly deflectable relative to each other by means of said coupling.

9. A gear type coupling as set forth in claim 8 in which,
   said resilient means includes a pair of coil springs urging said outer hub members away from each other into abutting relation with said inner hub members to thereby maintain said inner and outer hub members axially aligned.

10. A gear type coupling as set forth in claim 1 in which,
    a spindle shaft is connected to said inner hub member and extends axially therefrom,
    said inner hub member and a portion of said spindle shaft extending into the bore of said sleeve member,
    an annular plate secured to and extending inwardly from said sleeve member, and
    a second annular plate secured to said spindle shaft and having an annular portion in overlying abutting relation with a portion of said annular plate thereby sealing the bore on said sleeve member.

* * * * *